Patented Oct. 28, 1952

2,615,823

UNITED STATES PATENT OFFICE 2,615,823

BACTERICIDAL AND FUNGICIDAL COMPOSITION

Francis Earl Lawlor, Philadelphia, Pa., and Ferri Casciani, Lewiston, N. Y., assignors to Niagara Alkali Company, New York, N. Y., a corporation of New York No Drawing. Application March 30, 1950, Serial No. 153,004

6 Claims. (Cl. 117—138.5)

This invention relates to new and useful improvements in parasiticides, more particularly to fungicides and germicides. The invention further relates to methods of protecting organic material subject to attack by micro-organisms, such as fungi or bacteria, for example, in the mildew-proofing of fabrics and the destruction of pathogenic organisms.

The compounds which serve as the active components of the composition of the invention are polyalkoxychlorobenzenes and have the following general formula:

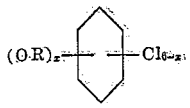

where R is a hydrocarbon aliphatic radical of from 2 to 18 carbon atoms either straight or branch chain, preferably an alkyl radical, and $x$ is a small number from 2 to 5, generally 2 or 3. The compounds are prepared by re-acting hexachlorobenzene with the alcohol (ROH) in the presence of an alkali metal hydroxide.

The compositions of the invention comprising the above described active components may be applied as a dust or as a solution. Compositions are generally applied diluted in the sense that they are mixed with a carrier such as a pulverant dry material or in solution or emulsion form. They may be mixed with other fungicides, bactericides, buffering or safening agents. The art well understands such carriers or diluents that are commonly used in the field in which this invention is related and they need not be further described.

The following examples are descriptive of several poly-alkoxychlorobenzenes which may be used as the active component in accordance with the invention, and their preparation.

Example I (a) 6 mols of hexachlorobenzene, 12 mols of sodium hydroxide and 27 mols of butanol were placed in a suitable reaction vessel and heated at atmospheric pressure. The preheating period required 0.7 hour to heat the mixture to a temperature of 114°–115° C. at which temperature it was maintained for one hour following which the mixture was cooled over a period of 0.6 hour. Based on distillation temperatures and chlorine analysis the product was found to be 94.2% butoxypentachlorobenzene and 5.8 di-butoxytetrachlorobenzene.

(b) 5 mols of hexachlorobenzene, 30 mols of sodium hydroxide and 67.5 mols of butanol were placed in a reaction vessel and heated to a temperature of 117°–123° C. for 7 hours utilizing a similar preheating and cooling schedule as in Example 1. Based on analysis by distillation and chlorine content, the product was found to contain 82.8% di-butoxytetrachlorobenzene and 17.2% monobutoxy pentachlorobenzene.

From a comparison of Examples I(a) and I(b) it will be noted that the extent of the substitution of the chlorine atom by the butoxy radical is a function of the proportions of the reacting components to the reaction time and the temperature of the reaction. Increased amounts of sodium hydroxide and butanol, together with a longer reaction time and higher temperature, favor the formation of the higher substituted compound. By adjusting these variables, a product can be made consisting almost entirely of the poly compound. By extending these variables, it is possible to make a composition having a substantial amount of the tri compound.

The reaction products can be used as mixtures or can be separated by fractional distillation under reduced pressure and the compounds used separately.

Example II (a) 6 mols of hexachlorobenzene, 12 mols of sodium hydroxide and 19.2 mols of ethylhexyl alcohol were reacted at a temperature of 139°–152° C. for two hours following a preheating time of 0.7 hour. Analysis showed the product to contain 90.8% mono(ethylhexoxy) pentachlorobenzene and 9.2% di-(ethylhexoxy) tetrachlorobenzene.

(b) The above was repeated except that the components were present in the ratio of 1 mol of hexachlorobenzene, 4 mols of sodium hydroxide and 7.9 mols of ethylhexyl alcohol. The reaction was continued for 6 hours at a temperature of 131°–139° C. following a 0.4 hour preheating time and a 0.5 hour cooling time. Analysis showed the product to contain 9.4% mono(ethylhexoxy) pentachlorobenzene, 90% di(ethylhexoxy) tetrachlorobenzene and 0.6% tri(ethylhexoxy) trichlorobenzene.

(c) The above was repeated except that the reaction time was three hours and the temperature was increased to 175–191.5° C. Analysis showed the product to contain 33.2% di(ethylhexoxy) tetrachlorobenzene and 66.8% tri(ethylhexoxy) trichlorobenzene. A comparison of the examples will show the effect of temperature on increasing the replacement of the number of chlorine atoms by the ether linkage. A comparison of examples will also show the effect of alterations in proportions and effect of reaction time.

Example III

¼ mol of hexachlorobenzene, ½ mol of sodium hydroxide and 2.3 mols of cyclohexyl alcohol were reacted at a temperature of 132°–147° C. for four hours. Analysis showed the product to contain 61% mono(cyclohexoxy) pentachlorobenzene and 39% di(cyclohexoxy) tetrachlorobenzene.

In all the above examples theoretical concentration would indicate 1 mol of caustic and 1 mol of the alcohol for each atom of chlorine to be replaced by an ether group. In practice, however, larger proportions are desirable and about 1½ to 3 times theoretical requirements appear to give preferable results depending somewhat on the degree of substitution desired small excess being used in the preparation of the mono compound. The reaction temperature and the length of reaction for a marked effect on the degree of replacement and reaction temperatures of from 100° C. up to reflux temperatures and reaction times of from ½ to 10 hours are indicated depending upon the other reaction variables.

As illustrative of the properties of the compounds, they were subjected to a soil-burial test. The results of these tests show that all of the ethers tested function as fungitoxicants against cellulose-destroying fungi which naturally occur in soil. In carrying out the tests, compounds are dissolved in petroleum ether to make a 5% solution. The petroleum ether was employed because of its known lack of fungitoxic effect and its rapid evaporation from the fabric, thus eliminating the possibility of its modifying reaction on material under test. The results are shown in the following table:

| Treating Agent | Burial Period in Weeks | Average Tensile Strengths After Burial |
|---|---|---|
| None | 0 | 103.0±1.6 |
|  | 1 | 9.3±3.2 |
|  | 2 | destroyed |
| 5% of Example I (b) in Petroleum Ether | 0 | 107.5±4.3 |
|  | 1 | 70.0±1.1 |
|  | 2 | 46.1±3.5 |

The variations from the average of 5 tensile strips from each variety of block shows that the treatment of fabrics may not have been entirely uniform, but the results are convincing demonstration of the excellent protection of the ethers against cellulose-destroying fungi.

Similar tests show the ethers to be excellent wood preservatives to possess requisite toxicity toward the wood destroying type of fungi.

As indicative of the germicidal or bactericidal properties of the ethers herein described, compositions of several of the above examples were tested by the agar paper disc plate method (Food and Drug Administration method, circular 198, 1931). In accordance with this method a 24-hour culture of Staphylococcus aureus, which had been grown on beef-extract-peptone broth, was used as the test organism and beef-extract-peptone agar was used as the test agar on the plate. As is well understood in connection with this test a paper disc 1.5 cm. in diameter is impregnated with the compound to be tested which was then placed in the center of a petri dish inoculated with the Staphylococcus aureus, and the width of the zone is indicative of the potency of the compound tested. The zone of inhibition indicates the absence of all growth of the test organism and the zone of slight inhibition refers to a few scattered colonies growing within the zone. The following results are obtained:

| Material Tested | Zone of Complete Inhibition | Zone of Slight Inhibition |
|---|---|---|
|  | Mm. | Mm. |
| Phenol Standard (1–20) | 1 | 0.5 |
| Example I (b) | 8.5 | 4 |
| Example II (b) | 12.5 | 0.5 |
| Example II (c) | 12.5 | 0.5 |

These results show that all three of these compounds have excellent inhibitory action and are considerably better than phenol as a bactericidal agent against Staphylococcus aureus. In each case upon subculturing portions taken from the zone of complete inhibition, no growth was obtained indicating complete killing of the test organisms. Tests on the mono-alkoxypentachlorobenzenes show them to be relatively inactive.

In order to evaluate fungicidal properties the method used was a standard by the American Phyto-pathological Society. This spore germination screen test allows comparison of new fungicides with known fungicides by means of LD–50 values, i. e., the dosage of a chemical which inhibits 50% of the potentially viable spores of the test fungi. The poly-alkoxy compounds were evaluated by the settling-tower method in which the compounds were sprayed from a stirred suspension. It was found that the adsorption of the compounds on a solid clay at a 1:1 ratio resulted in a mixture which produced a uniform suspension when agitated. A series of dosages, i. e., known deposits, was obtained on glass slides in accordance with the recognized technique in the process and the effect of each dosage on spores of the two test fungi used (Alternaria oleracea and Sclerotinia fructicola) in 0.1% orange juice drops was then determined. The percent spore inhibition at each dosage was plotted on a logarithmic probability scale and the LD–50 values determined. Results are shown in the following table:

| Compound | Alternaria oleracea | | Sclerotinia fructicola | |
|---|---|---|---|---|
|  | LD–50 | Class | LD–50 | Class |
| Di-n-butoxytetrachlorobenzene (Example I (b)) | 42 | C | 46 | C |

These results and the official classification show the compounds to have use as an agricultural fungicide.

We claim:

1. A method of destroying micro-organisms which comprises contacting them with a poly-alkoxychlorobenzene, selected from the group consisting of di-alkoxytetrachlorobenzenes and tri-alkoxytrichlorobenzenes.

2. A method of destroying micro-organisms which comprises contacting them with a di-alkoxytetrachlorobenzene.

3. A method of protecting cellulosic material from attack by micro-organisms which comprises applying to said material a poly-alkoxychlorobenzene, selected from the group consisting of di-alkoxytetrachlorobenzenes and tri-alkoxytrichlorobenzenes.

4. A method of protecting cellulosic material from attack by micro-organisms which comprises applying to said material a di-alkoxytetrachlorobenzene.

5. Cellulosic material normally attacked by micro-organisms and rendered resistant thereto by the application of a poly-alkoxychlorobenzene, selected from the group consisting of di-alkoxytetrachlorobenzenes and tri-alkoxytrichlorobenzenes.

6. Cellulosic material normally attacked by micro-organisms and rendered resistant thereto by the application of a di-alkoxytetrachlorobenzene.

FRANCIS EARL LAWLOR.
FERRI CASCIANI.

REFERENCES CITED

The following references are of record in the file of this patent:

UNITED STATES PATENTS

| Number | Name | Date |
| --- | --- | --- |
| 2,205,394 | Coleman et al. | June 25, 1940 |
| 2,327,338 | Carswell | Aug. 24, 1943 |
| 2,416,263 | MacMullen | Feb. 18, 1947 |
| 2,421,924 | Schroeder et al. | June 10, 1947 |
| 2,463,541 | Houk | Mar. 8, 1949 |

OTHER REFERENCES

Beilstein's Handbook, Volume 6, page 820.
Pectynin J. Gen. Chem. (U. S. S. R.) Volume 17, pages 278 to 282 (1947).
Through Chem. Abstracts, Volume 42, page 534 (1948).